United States Patent
Kim et al.

(10) Patent No.: US 8,658,060 B2
(45) Date of Patent: Feb. 25, 2014

(54) LIQUID CRYSTAL COMPOSITION AND LIQUID CRYSTAL DISPLAY DEVICE HAVING THE SAME

(75) Inventors: SiHeun Kim, Asan-si (KR); Duck Jong Suh, Seoul (KR); Won-Gap Yoon, Suwon-si (KR); Jieun Jang, Suwon-si (KR); Jaeweon Hur, Busan (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/571,132

(22) Filed: Aug. 9, 2012

(65) Prior Publication Data

US 2013/0265508 A1  Oct. 10, 2013

(30) Foreign Application Priority Data

Apr. 10, 2012 (KR) ........................ 10-2012-0037504

(51) Int. Cl.
- *C09K 19/30* (2006.01)
- *C09K 19/52* (2006.01)
- *C09K 19/06* (2006.01)
- *C09K 19/12* (2006.01)
- *C09K 19/00* (2006.01)
- *C09K 19/02* (2006.01)
- *G02F 1/1335* (2006.01)

(52) U.S. Cl.
USPC .............. 252/299.63; 252/299.01; 252/299.6; 252/299.66; 428/1.1; 428/1.3; 349/15; 349/179; 349/182; 349/183

(58) Field of Classification Search
USPC ............... 252/299.01, 299.6, 299.63, 299.66; 428/1.1, 1.3; 349/15, 179, 182, 183
See application file for complete search history.

(56) References Cited

U.S. PATENT DOCUMENTS

| | | | |
|---|---|---|---|
| 6,010,642 A | 1/2000 | Takatsu et al. | |
| 7,198,827 B1 | 4/2007 | Takeuchi et al. | |
| 7,875,326 B2 * | 1/2011 | Lee et al. | ........................ 428/1.1 |
| 2009/0015532 A1 | 1/2009 | Katayama et al. | |
| 2009/0162576 A1 | 6/2009 | Lee et al. | |
| 2010/0026953 A1 | 2/2010 | Hirschmann et al. | |
| 2010/0294992 A1 | 11/2010 | Fujita et al. | |
| 2011/0063563 A1 | 3/2011 | Long et al. | |

* cited by examiner

*Primary Examiner* — Geraldina Visconti

(74) *Attorney, Agent, or Firm* — H.C. Park & Associates, PLC

(57) ABSTRACT

A liquid crystal composition including a first neutral liquid crystal, a second neutral liquid crystal, a first polar liquid crystal, a second polar liquid crystal, and a third polar liquid crystal. A liquid crystal display device includes a backlight unit and a liquid crystal display panel to form an image using light provided by the backlight unit. The liquid crystal display panel includes a first base substrate, an opposing second base substrate, and the liquid crystal composition disposed between the first and second base substrates.

20 Claims, 4 Drawing Sheets

LIQUID CRYSTAL COMPOSITION AND LIQUID CRYSTAL DISPLAY DEVICE HAVING THE SAME

CROSS-REFERENCE TO RELATED APPLICATION

This U.S. non-provisional patent application claims priority from and the benefit of Korean Patent Application No. 10-2012-0037504, filed on Apr. 10, 2012, which is hereby incorporated by reference for all purposes as if fully set forth herein.

BACKGROUND

1. Field

The present disclosure relates to a liquid crystal composition and a liquid crystal display device having the same.

2. Discussion of the Background

A three-dimensional image display device separates an image into left eye and right eye images having a binocular disparity, and respectively provides each of the images to a left eye and a right eye of an observer. The observer may combine the left eye image and the right eye image to perceive a stereoscopic image.

A binocular disparity type display utilizes disparity images having a large stereoscopic effect and may be classified as a glasses-type and a non-glasses-type. In a glasses-type liquid crystal display device, the left eye image and the right eye image may be alternately displayed, and polar properties incident to optical glasses may be switched to accomplish the stereoscopic image. In a non-glasses-type liquid crystal display device, a lenticular lens or a parallax barrier may be provided a certain distance from a two-dimensional image panel, and an observer's left and right eyes may respectively perceive two different types of image information.

In a three-dimensional liquid crystal display device using a lenticular lens, left and right images are arranged in a stripe pattern at a focus point of the lenticular lens having a semicylindrical shape. Through the lenticular lens, the left and right images may be separated according to a directional property of a lens placode, and the liquid crystal may be perceived by an observer without glasses.

In a three-dimensional liquid crystal display device using a parallax barrier, vertical slits having a thin stripe shape may be arranged with a certain interval, to transmit or block light. Then, the left and right images are alternately disposed at a certain interval in front of or behind the vertical slits. Through the slits, left and right images may be accurately separated on the basis of geometrical and optical aspects at a point of sight, to form the three-dimensional image.

SUMMARY

The present disclosure provides a liquid crystal composition for a two-dimensional or three-dimensional liquid crystal display device.

The present disclosure also provides a two-dimensional or three-dimensional liquid crystal display device that can be stably driven at a high temperature and with a rapid response time.

The present disclosure also provides a two-dimensional or three-dimensional liquid crystal display device having low power consumption and liquid crystals having improved durability.

Embodiments of the inventive concept provide liquid crystal compositions including a first neutral liquid crystal, a second neutral liquid crystal, a first polar liquid crystal, a second polar liquid crystal, and a third polar liquid crystal.

The first neutral liquid crystal may be represented by following chemical formula 1 and may be included in an amount of about 48 wt %-about 55 wt %, based on the total weight of the liquid crystal composition. The second neutral liquid crystal may be represented by following chemical formula 2 and may be included in an amount of about 27 wt %-31 wt %. The first polar liquid crystal may be represented by following chemical formula 3 and may be included in an amount of about 4.9 wt %-about 5.2 wt %. The second polar liquid crystal may be represented by following chemical formula 4 and may be included in an amount of about 13 wt %-about 15 wt %. The third polar liquid crystal may be represented by following chemical formula 5 and may be included in an amount of about 2.0 wt %-about 2.1 wt %.

[Chemical formula 1]

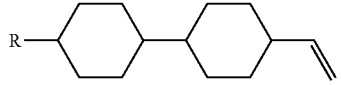

[Chemical formula 2]

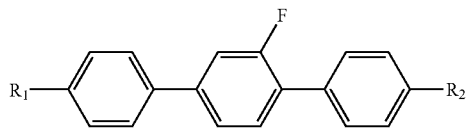

[Chemical formula 3]

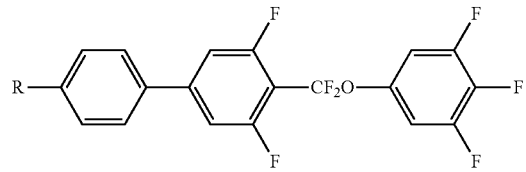

[Chemical formula 4]

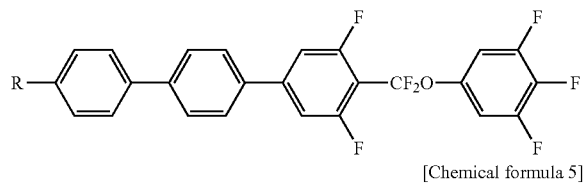

[Chemical formula 5]

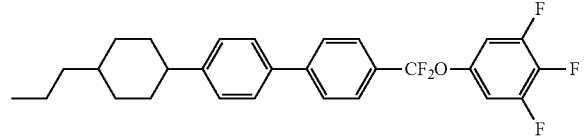

In the chemical formulae, each of R, $R_1$, and $R_2$ represents an alkyl group, an alkenyl group, or an alkoxy group, having 2-5 carbons.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
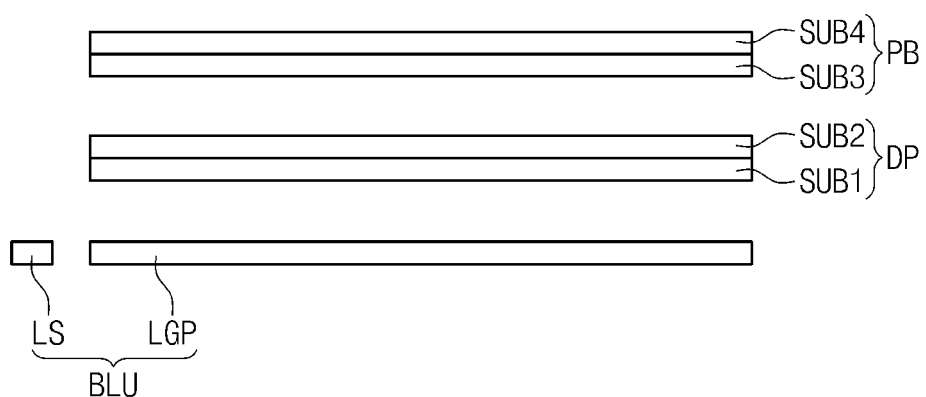
FIG. 1 is a cross-sectional view of a liquid crystal display device in accordance with an exemplary embodiment of the present inventive concept.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

A liquid crystal composition in accordance with the inventive concept may be used in a liquid crystal display device. The display device may be driven in a two-dimensional image mode (2D mode), a three-dimensional image mode (3D mode), or in a 2D to 3D/3D to 2D conversion mode.

A first liquid crystal layer may include a liquid crystal composition obtained by mixing two or more types of liquid crystals. The liquid crystal composition may be a twisted nematic phase liquid crystal composition. The liquid crystal composition may have a nematic phase-isotropic phase transition temperature (Tni) at least about 78° C. and may have a pitch in a range of from about 50 μm to about 80 μm. The liquid crystal composition may also have a dielectric anisotropy (Δ∈) in a range of from about 4.0 to about 6.0 and a rotational viscosity of about 55 mPa·s or less.

The liquid crystal composition in the first liquid crystal layer may include neutral liquid crystals and polar liquid crystals. The neutral liquid crystals may include first and second neutral liquid crystals. The polar liquid crystals may include a first, second, and third polar liquid crystals. Hereinafter, weight percentages recited for various liquid crystals are based on the total weight of the liquid crystal composition, unless otherwise specified.

The first neutral liquid crystals may be at least one type of liquid crystal represented by the following chemical formula 1 and may be included by an amount of about 48 wt %-about 55 wt %. In an exemplary embodiment, the amount of the first neutral liquid crystal may be about 50 wt %. In chemical formula 1, R may be an alkyl group, an alkenyl group, or an alkoxy group, having a about 2~5 carbons.

[Chemical formula 1]

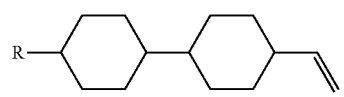

The first neutral liquid crystal may have a relatively low rotational viscosity, as compared to the average rotational viscosity of the liquid crystal composition. The first neutral liquid crystal may have a relatively high nematic phase-isotropic phase transition temperature (Tni), as compared to that of the other liquid crystals of the liquid crystal composition.

When the amount of the first neutral liquid crystal in the liquid crystal composition is less than about 48 wt %, the rotational viscosity may exceed about 55 mPa·s, due to other liquid crystals having a higher rotational viscosity. In this case, it may be difficult to obtain a response time needed for the 2D mode and 3D mode. The response time may be about 4.0 ms or less. For example, the response time may be in a range of from about 3.0 ms to about 3.99 ms, or may be less than about 3.0 ms.

When the amount of the first neutral liquid crystal exceeds about 55 wt %, the nematic phase-isotropic phase transition temperature (Tni) may be less than about 78° C. Therefore, rapid driving at a relatively high temperature may become difficult to achieve. In addition, when the amount of the first neutral liquid crystal exceeds about 55 wt %, a refractive index anisotropy (Δn) may be less than about 0.130, image quality may be decreased, and crystallization may occur when the liquid crystal composition is stored at a low temperature for an extended period.

The second neutral liquid crystal may be at least one type of liquid crystal represented by the following chemical formula 2 and may be included by an amount of about 27 wt %-about 31 wt %. In an exemplary embodiment, the amount of the second neutral liquid crystal may be about 29 wt %. In chemical formula 2, $R_1$ and $R_2$ may be an alkyl group, an alkenyl group, or an alkoxy group, having about 2-5 carbons.

[Chemical formula 2]

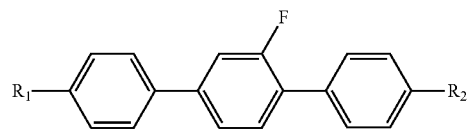

The second neutral liquid crystal may have relatively high refractive index anisotropy and a relatively low rotational viscosity, as compared to the corresponding average values of the liquid crystal composition. When the amount of the second neutral liquid crystal included in the liquid crystal composition is less than about 27 wt %, the nematic phase-isotropic phase transition temperature (Tni) may become less than about 78° C. As such, high temperature driving may become difficult. In addition, a refractive index anisotropy (Δn) may be less than about 0.130, and image quality may be reduced. When the amount of the second neutral liquid crystal exceeds about 31 wt %, a dielectric anisotropy (Δ∈) may be decreased and a response time may be increased. In addition, crystallization may be generated when the liquid crystal composition is stored at a low temperature for an extended period.

The first polar liquid crystal may be at least one type of liquid crystal represented by the following chemical formula 3 and may be included by an amount of about 4.9 wt %-about 5.2 wt %. In an exemplary embodiment, the amount of the first polar liquid crystal may be about 5 wt %. In chemical formula 3, R may be an alkyl group, an alkenyl group, or an alkoxy group, having about 2-5 carbons.

[Chemical formula 3]

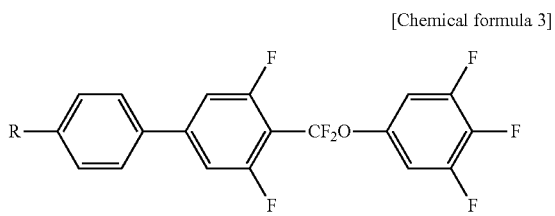

The first polar liquid crystal may have a relatively high polarity, as compared to an average polarity of the liquid crystal composition. When the amount of the first polar liquid crystal in the liquid crystal composition is less than about 4.9 wt %, a response time may increase and a contrast ratio may decrease. When the amount of the first polar liquid crystal exceeds about 5.2 wt %, the nematic phase-isotropic phase transition temperature (Tni) may be less than about 78° C. As such, driving at a relatively high temperature may become difficult.

The second polar liquid crystal may include at least one type of the liquid crystal represented by the following chemical formula 4 and may be included by an amount of about 13 wt %-about 15 wt %. In an exemplary embodiment, the amount of the second polar liquid crystal may be about 14 wt %. In chemical formula 4, R may be an alkyl group, an alkenyl group, or an alkoxy group, having about 2-5 carbons.

[Chemical formula 4]

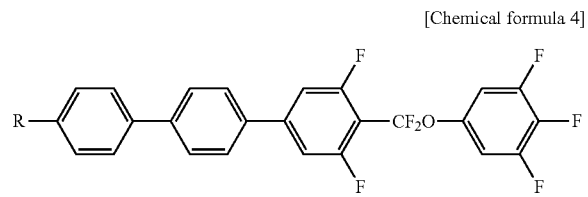

The second polar liquid crystal may have a relatively high dielectric anisotropy and a relatively low rotational viscosity, as compared to corresponding average values of the liquid crystal composition. When the amount of the second polar liquid crystal in the liquid crystal composition is less than about 13 wt %, the nematic phase-isotropic phase transition temperature (Tni) may become less than about 78° C. As such driving at a relatively high temperature may become difficult and a contrast ratio may decrease. When the amount of the second polar liquid crystal exceeds about 15 wt %, a rotational viscosity may exceed 55 mPa·s and a rapid response time needed for a 3D mode may not be obtained.

The third polar liquid crystal may be the liquid crystal represented by the following chemical formula 5 and may be included by an amount of about 2.0 wt %-about 2.1 wt %. In an exemplary embodiment, the amount of the third polar liquid crystal may be about 2 wt %.

[Chemical formula 5]

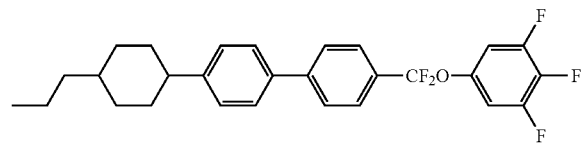

The third polar liquid crystal may have a relatively high nematic phase-isotropic phase transition temperature (Tni), a relatively high dielectric anisotropy, and a relatively low rotational viscosity, as compared to corresponding average values of the liquid crystal composition. When the amount of the third polar liquid crystal in the liquid crystal composition is less than about 2.0 wt %, the nematic phase-isotropic phase transition temperature (Tni) may become less than about 78° C. and driving at a relatively high temperature may become difficult. When the amount of the third polar liquid crystal exceeds about 2.1 wt %, the rotational viscosity may exceed about 55 mPa·s. As such, a rapid response time for a 3D mode may be difficult to obtain.

Experiment 1

Evaluation on Physical Properties with Respect to the Liquid Crystal Composition in Accordance with Exemplary Embodiments Physical properties on the liquid crystal composition in accordance with exemplary embodiments and a conventional liquid crystal composition are illustrated in following Table 1. The exemplary liquid crystal composition includes about 50 wt % of the first neutral liquid crystal, about 29 wt % of the second neutral liquid crystal, about 5 wt % of the first polar liquid crystal, about 14 wt % of the second polar liquid crystal, and about 2 wt % of the third polar liquid crystal.

TABLE 1

| Physical Properties | Conventional Liquid Crystal | Liquid Crystals of Exemplary embodiments |
|---|---|---|
| Nematic Phase-isotropic Phase Transition Temperature (Tni) | 74.5° C. | 80.5° C. |
| Refractive Index Anisotropy (Δn) | 0.136 | 0.138 |
| Dielectric Anisotropy (Δε(ε//)) | 4.5 (8.0) | 5.1 (8.0) |
| Rotational Viscosity (mPa · s) | 49 | 50.5 |

As illustrated in Table 1, the exemplary liquid crystal composition has a high nematic phase-isotropic phase transition temperature, and substantially the same refractive index anisotropy, dielectric anisotropy, and rotational viscosity as the conventional liquid crystal composition.

Experiment 2

Evaluation on the Amount of the First Neutral Liquid Crystal

A liquid crystal composition was prepared by mixing about 50 wt % of the first neutral liquid crystal, about 29 wt % of the second neutral liquid crystal, about 5 wt % of the first polar liquid crystal, about 14 wt % of the second polar liquid crystal and about 2 wt % of the third polar liquid crystal. The amount of the first neutral liquid crystal was changed as illustrated in Table 2, and physical properties of the prepared liquid crystal compositions and properties of liquid crystal display devices using the liquid crystal compositions were evaluated. In Table 2, the amounts of the remaining liquid crystals, except for the first neutral liquid crystal, were adjusted so that mixing ratios between the remaining liquid crystals were kept constant.

In the tables illustrated hereinafter, Vt represents a voltage at a transmittance saturation point in a graph illustrating voltage with respect to transmittance for a display device. Ton and Toff respectively represent a response rate in accordance with on and off states of pixels in a liquid crystal display panel, and Tt represents a total response time.

TABLE 2

| | | Amount of First Neutral Liquid Crystal | | | | |
|---|---|---|---|---|---|---|
| | | 50 wt % | 52.5 wt % | 55 wt % | 47.5 wt % | 45 wt % |
| Physical Properties | Tni (° C.) | 81 | 78 | 76 | 83 | 85 |
| | Rotational viscosity (mPa·s) | 50.5 | 46.8 | 44.8 | 55.2 | 56.0 |
| | $\Delta n$ | 0.138 | 0.131 | 0.126 | 0.145 | 0.15 |
| | $\epsilon//$ | 8 | 7.6 | 7.1 | 8.6 | 9.1 |
| | $\epsilon\perp$ | 2.9 | 3 | 2.9 | 3 | 3 |
| | $\Delta\epsilon$ | 5.1 | 4.6 | 4.2 | 5.6 | 6.1 |
| Vt(V) | 90 | 90 (1.8 V) | 95 | 95 | 87 | 83 |
| | 10 | 10 (2.7 V) | 15 | 18 | 7 | 5 |
| Response Times (ms) | Ton | 0.9 | 0.89 | 0.91 | 0.9 | 0.91 |
| | Toff | 3.02 | 2.99 | 2.97 | 3.18 | 3.18 |
| | Tt | 3.92 | 3.88 | 3.88 | 4.08 | 4.09 |

As illustrated in Table 2, when the amount of the first neutral liquid crystal is about 55 wt %, the nematic phase-isotropic phase transition temperature is about 76° C., which is very low, and the refractive index anisotropy is about 0.126, at most. Accordingly, the liquid crystal may be degraded when the display device is continuously driven at a high temperature. When the amount of the first neutral liquid crystal is about 47.5 wt % or less, the rotational viscosity is about 55.2 mPa·s or more, and the response time is about 4 ms or more. Thus, the response time of 4 ms or less is not accomplished.

Experiment 3

Evaluation on the Amount of the Second Neutral Liquid Crystal

A liquid crystal composition was prepared by mixing about 50 wt % of the first neutral liquid crystal, about 29 wt % of the second neutral liquid crystal, about 5 wt % of the first polar liquid crystal, about 14 wt % of the second polar liquid crystal, and about 2 wt % of the third polar liquid crystal. The amount of the second neutral liquid crystal was changed as illustrated in Table 3, and physical properties of the prepared liquid crystal compositions and properties of liquid crystal display devices using the liquid crystal compositions were evaluated. In Table 3, the amounts of the remaining liquid crystals except for the second neutral liquid crystal were adjusted so that mixing ratios between the remaining liquid crystals were kept constant.

TABLE 3

| | Amount of Second Neutral Liquid Crystal | 30.5 wt % | 31.9 wt % | 27.6 wt % | 26.1 wt % |
|---|---|---|---|---|---|
| Physical Properties | Tni (° C.) | 84 | 87 | 78 | 74 |
| | Rotational viscosity (mPa·s) | 51.80 | 53.80 | 48.00 | 46.00 |
| | $\Delta n$ | 0.143 | 0.15 | 0.133 | 0.126 |
| | $\epsilon//$ | 7.8 | 7.5 | 8.5 | 8.5 |
| | $\epsilon\perp$ | 3 | 2.9 | 3.5 | 3 |
| | $\Delta\epsilon$ | 4.8 | 4.6 | 5 | 5.5 |
| Vt(V) | 90 | 94 | 96 | 89 | 85 |
| | 10 | 13 | 17 | 9 | 7 |
| Response Times (ms) | Ton | 0.93 | 1.25 | 0.88 | 0.86 |
| | Toff | 3 | 2.95 | 3.01 | 3.02 |
| | Tt | 3.93 | 4.2 | 3.89 | 3.88 |

As illustrated in Table 3, when the amount of the second neutral liquid crystal is about 31.9 wt %, the dielectric anisotropy is about 4.6, which is very low, and the response time is about 4.2 ms, which is greater than about 4 ms. When the amount of the second neutral liquid crystal is about 26.1 wt %, the nematic phase-isotropic phase transition temperature is about 74° C., which is very low, and the refractive index anisotropy is about 0.126, at most. Accordingly, the liquid crystal may be degraded when the display device is continuously driven at a high temperature.

Experiment 4

Evaluation on the Amount of the First Polar Liquid Crystal

A liquid crystal composition was prepared by mixing about 50 wt % of the first neutral liquid crystal, about 29 wt % of the second neutral liquid crystal, about 5 wt % of the first polar liquid crystal, about 14 wt % of the second polar liquid crystal, and about 2 wt % of the third polar liquid crystal. The amount of the first polar liquid crystal was changed as illustrated in Table 4, and physical properties of the prepared liquid crystal compositions and properties of liquid crystal display devices using the liquid crystal compositions were evaluated. In Table 4, the amounts of the remaining liquid crystals except for the first polar liquid crystal were adjusted so that mixing ratios between the remaining liquid crystals were kept constant.

TABLE 4

| | Amount of First Polar Liquid Crystal | 5.3 wt % | 5.5 wt % | 4.8 wt % | 4.5 wt % |
|---|---|---|---|---|---|
| Physical Properties | Tni (° C.) | 77 | 73 | 85 | 89 |
| | Rotational Viscosity (mPa·s) | 50.20 | 51.20 | 50.00 | 49.00 |
| | $\Delta n$ | 0.136 | 0.135 | 0.14 | 0.141 |
| | $\epsilon//$ | 9.1 | 10.4 | 7.1 | 7 |
| | $\epsilon\perp$ | 3.1 | 3.2 | 3.1 | 3.2 |
| | $\Delta\epsilon$ | 6 | 7.2 | 4 | 3.8 |
| Vt(V) | 90 | 78 | 61 | 97 | 98 |
| | 10 | 4 | 2 | 24 | 27 |
| Response Times (ms) | Ton | 0.87 | 0.85 | 1.31 | 1.37 |
| | Toff | 3.07 | 3.1 | 2.98 | 2.94 |
| | Tt | 3.94 | 3.95 | 4.29 | 4.31 |

As illustrated in Table 4, when the amount of the first polar liquid crystal is about 5.3 wt % or more, the nematic phase-isotropic phase transition temperature about 77° C. or less, which is low. Accordingly, the liquid crystal may be degraded when the display device is continuously driven at a high temperature. When the amount of the first polar liquid crystal is about 4.8 wt % or less, the dielectric anisotropy is about 4 or less, which is low, and the voltage for the transmittance saturation is about 24V or more, which is very high. In addition, the response time is about 4 ms or more. Accordingly, the power consumption while driving the liquid crystals may be increased and the response time may also be increased.

Experiment 5

Evaluation on the Amount of the Second Polar Liquid Crystal

A liquid crystal composition was prepared by mixing about 50 wt % of the first neutral liquid crystal, about 29 wt % of the second neutral liquid crystal, about 5 wt % of the first polar liquid crystal, about 14 wt % of the second polar liquid crystal, and about 2 wt % of the third polar liquid crystal. The amount of the second polar liquid crystal was changed as illustrated in Table 5, and physical properties of the prepared liquid crystal compositions and properties of liquid crystal display devices using the liquid crystal compositions were evaluated. In Table 5, the amounts of the remaining liquid crystals except for the second polar liquid crystal were adjusted so that mixing ratios between the remaining liquid crystals were kept constant

TABLE 5

| Amount of Second Polar Liquid Crystal | | 14.7 wt % | 15.4 wt % | 13.3 wt % | 12.6 wt % |
|---|---|---|---|---|---|
| Physical Properties | Tni (° C.) | 82.1 | 83.7 | 78 | 77 |
| | Rotational viscosity (mPa·s) | 54.30 | 59.80 | 45.00 | 41.00 |
| | $\Delta n$ | 0.14 | 0.144 | 0.136 | 0.132 |
| | $\epsilon//$ | 9.3 | 11 | 7.3 | 6.7 |
| | $\epsilon\perp$ | 3.1 | 3.2 | 3.1 | 3.2 |
| | $\Delta\epsilon$ | 6.2 | 7.8 | 4.2 | 3.5 |
| Vt(V) | 90 | 77 | 56 | 96 | 98 |
| | 10 | 4 | 2 | 19 | 32 |
| Response Times (ms) | Ton | 0.87 | 0.86 | 0.91 | 1 |
| | Toff | 3.1 | 3.47 | 2.86 | 2.68 |
| | Tt | 3.97 | 4.33 | 3.77 | 3.68 |

As illustrated in Table 5, when the amount of the second polar liquid crystal is about 15.4 wt %, the rotational viscosity is about 59 or move, which is very high, and the total response time is 4 ms or more. However, when the amount of the second polar liquid crystal is about 12.6 wt %, the nematic phase-isotropic phase transition temperature is about 77° C., which is very high, and the voltage for the transmittance saturation is about 32V, which is very high. Accordingly, the liquid crystal may be degraded when the display device is continuously driven at a high temperature, and the power consumption while driving the liquid crystals may increase.

Experiment 6

Evaluation on the Amount of the Third Polar Liquid Crystal

A liquid crystal composition was prepared by mixing about 50 wt % of the first neutral liquid crystal, about 29 wt % of the second neutral liquid crystal, about 5 wt % of the first polar liquid crystal, and about 14 wt % of the second polar liquid crystal, and about 2 wt % of the third polar liquid crystal. The amount of the third polar liquid crystal was changed as illustrated in Table 6, and physical properties of thus prepared liquid crystal compositions and properties of liquid crystal display devices using the liquid crystal compositions were evaluated. In Table 6, the amounts of the remaining liquid crystals except for the third polar liquid crystal were adjusted so that mixing ratios between the remaining liquid crystals were kept constant.

TABLE 6

| Amount of Third Polar Liquid Crystal | | 2.1 wt % | 2.2 wt % | 1.90 wt % | 1.8 wt % |
|---|---|---|---|---|---|
| Physical Properties | Tni (° C.) | 85.5 | 90.7 | 75 | 70.5 |
| | Rotational viscosity (mPa·s) | 53.90 | 58.50 | 46.00 | 42.00 |
| | $\Delta n$ | 0.139 | 0.141 | 0.137 | 0.135 |
| | $\epsilon//$ | 8.2 | 9.4 | 7.8 | 7 |
| | $\epsilon\perp$ | 3 | 3 | 3 | 3 |
| | $\Delta\epsilon$ | 5.2 | 6.4 | 4.8 | 4 |
| Vt(V) | 90 | 87 | 76 | 92 | 97 |
| | 10 | 7 | 4 | 12 | 23 |
| Response Times (ms) | Ton | 0.91 | 0.89 | 0.88 | 0.9 |
| | Toff | 3.01 | 3.48 | 2.89 | 2.72 |
| | Tt | 3.92 | 4.37 | 3.77 | 3.62 |

As illustrated in Table 6, when the amount of the third polar liquid crystal is about 2.2 wt %, the rotational viscosity is about 58, which is very high, and the response time is about 4.37 ms, which is greater than 4 ms. However, when the amount of the third polar liquid crystal is about 1.9 wt % or less, the nematic phase-isotropic phase transition temperature is about 75° C., which is very low, and the voltage for the transmittance saturation is about 23V, which is very high. Accordingly, the liquid crystal may be degraded when the display device is continuously driven at a high temperature.

Experiment 7

Evaluation on Properties of a Display Device Using the Liquid Crystal Composition in Accordance with Exemplary Embodiments A liquid crystal composition was prepared by mixing about 50 wt % of the first neutral liquid crystal, about 29 wt % of the second neutral liquid crystal, about 5 wt % of the first polar liquid crystal, about 14 wt % of the second polar liquid crystal, and about 2 wt % of the third polar liquid crystal. Properties on the display device using the liquid crystal composition are illustrated in Table 7.

TABLE 7

| | Color Coordinates | Luminance (Relative Values) | Contrast Ratio (Center Portion) | Viewing angle (°) (up/down/left/right) | Total Response Time (ms) (Ton/Toff) |
|---|---|---|---|---|---|
| Conventional Display Device | (0.315, 0.335) | 274 | 1166 | 80/75/80/80 | 3.7 ms (1.0/2.7) |
| Display Device of Exemplary embodiment | (0.315, 0.334) | 278 | 1116 | 80/77/80/80 | 3.7 ms (1.0/2.7) |

As illustrated in Table 7, the liquid crystal display device using the liquid crystal composition in accordance with exemplary embodiments has substantially the same color coordinate, luminance, contrast ratio, viewing angle, and response time, as compared to the conventional display device.

Exemplary Embodiments

The liquid crystal composition in accordance with exemplary embodiments may be used in a 2D mode and a 3D mode liquid crystal display device requiring liquid crystals exhibiting a rapid driving speed and having heat-resistance, and particularly, used in the 3D mode liquid crystal display device. The display device may operate using a parallax barrier mode, a lenticular lens mode, a patterned retarder mode, a shutter glass mode, or the like.

To operate using the parallax barrier mode, the lenticular lens mode, or the patterned retarder mode, the display device may respectively include a parallax barrier, a lenticular lens, or a patterned retarder. Alternatively, a stereoscopic image may be obtained using a light transforming part. The light transforming part may be turned off during the 2D mode, so as to transmit received light without changing aspects of the light, and may be turned on during the 3D mode to change the light into a right eye light and a left eye light.

In the shutter glass mode, a normal image is played during the 2D mode, and a left eye image and a right eye image are displayed successively during the 3D mode. During the 3d mode, left and right lenses of the glasses block received light according to when the left eye image and the right eye image are displayed on a liquid crystal display panel, to form the stereoscopic image.

The light transforming part may be turned on or turned off, according to whether the output image from an image displaying part corresponds to a two-dimensional image or a three-dimensional image. The light transforming part may include a liquid crystal layer disposed between two substrates. The liquid crystal layer may be controlled to operate as the parallax barrier, the lenticular lens, or the patterned retarder, and the like.

Generally, through an addition of the parallax barrier, the lenticular lens, the patterned retarder, the shutter glass, and the like, the transmittance may be decreased in a liquid crystal display device in the 3D mode (or for a liquid crystal display device having a 3D conversion mode). In order to obtain a binocular disparity in the liquid crystal display device, the left eye image and the right eye image may be displayed by alternately disposed pixels (half the pixels displaying each image), or may be displayed by all of the pixels successively over a time interval. In addition, in order to decrease a cross talk defects possibly generated between neighboring pixels, an additional light shutting part may be formed on each of the pixels.

Further, each of the parallax barrier, the lenticular lens, the patterned retarder and the shutter glass may have a certain degree of light absorption. Accordingly, the total light transmittance of the liquid crystal display device may be decreased and the luminance of the image displayed on the liquid crystal display device may be reduced. In order to overcome the decreased transmittance and luminance, a light source having a high luminance may be needed. However, the liquid crystals may be degraded due to heat generated by the light source. The liquid crystals in the liquid crystal display device of the 2D mode also may be degraded due to the heat generated from the light source when driven for an extended period.

In accordance with the liquid crystal composition of exemplary embodiments, the nematic phase-isotropic phase transition temperature may be at least about 78° C., for example, about 80° C. As such, the nematic phase-isotropic phase transition temperature is remarkably higher than the nematic phase-isotropic phase transition temperature of the conventional liquid crystal composition. Accordingly, degradation of the liquid crystals due to the heat generated from a backlight unit may be substantially reduced.

In order to obtain a left eye image and a right eye image simultaneously in a 3D mode, the driving speed of the pixels may need to be faster than that of a 2D mode. Particularly, each of the pixels may be driven at about 60 Hz or about 120 Hz, in the 2D mode, and at about 175 Hz in the 3D mode. Since the response time of the liquid crystal composition is less than about 4.0 ms, the 3D image may be effectively obtained.

Figure 2:
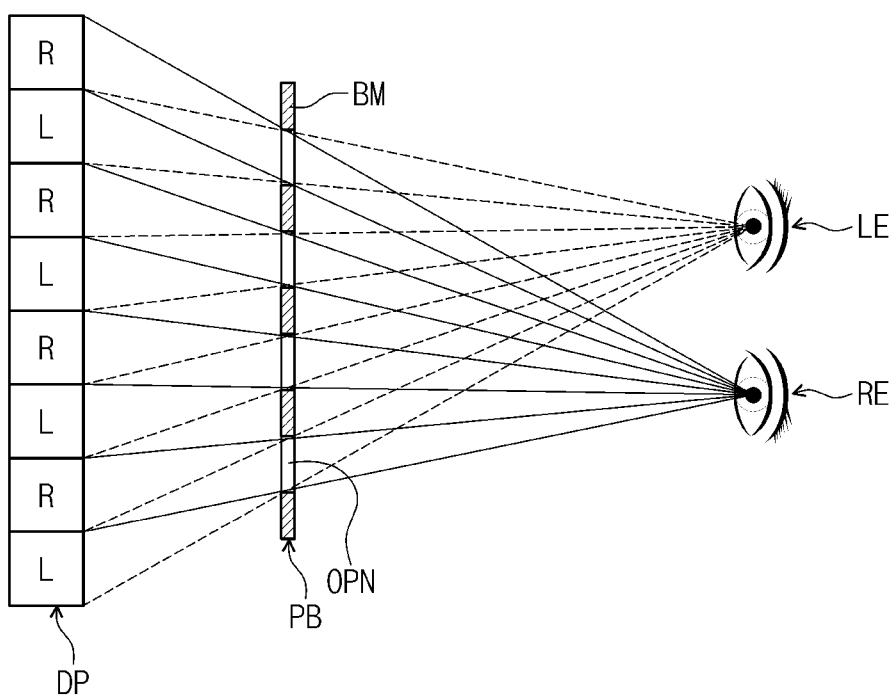
FIG. 2 is a cross-sectional view of the liquid crystal display device in FIG. 1, illustrating an operation of a three-dimensional mode.

FIG. 1 is a cross-sectional view of a liquid crystal display device in accordance with an embodiment of the present inventive concept. The liquid crystal display device operates in a 2D mode and/or a 3D mode. FIG. 2 is a cross-sectional view of the liquid crystal display device in FIG. 1 illustrating the 3D mode in operation.

Referring to FIGS. 1 and 2, the liquid crystal display device may include a backlight unit BLU to emit light, a liquid crystal display panel DP to receive the light and display an image, and a parallax barrier panel PB disposed on the liquid crystal display panel DP.

The backlight unit BLU may include a light source LS to generate the light and a light guiding plate LGP to receive the light and guide the received light to the parallax barrier panel PB. In exemplary embodiments, the light source LS may include at least one light emitting diode and may be provided at least one side of the light guiding plate LGP. In FIG. 1, the backlight unit BLU is an edge type, however, the BLU may be a direct type.

The liquid crystal display panel DP may include a first base substrate SUB1, a second base substrate SUB2 facing the first base substrate SUB1, and a liquid crystal layer (not illustrated) disposed between the first base substrate SUB1 and the second base substrate SUB2. The first base substrate SUB1 may include a matrix of pixel electrodes (not illustrated). On the first base substrate SUB1, gate lines extended in a row direction, data lines extended in a column direction, and thin film transistors (not illustrate) connected to the pixel electrodes with one-to-one correspondence may be provided.

On the second base substrate SUB2, a color filter layer (not illustrated) and a common electrode (not illustrated) may be provided. The color filter layer may include red, green, and blue color pixels, and each of the color pixels may be disposed so as to correspond with one pixel electrode. The common electrode may be disposed on the color filter layer and forms an electric filed with the pixel electrodes.

The liquid crystal layer may include a large numbers of liquid crystal molecules. The orientation of the liquid crystal molecules may be controlled by the electric field. Accordingly, the liquid crystal display panel DP may control the transmittance of the received light by pixel units, to display an image.

The liquid crystal layer may include a liquid crystal composition obtained by mixing two or more kinds of liquid crystals, in accordance with exemplary embodiments. The liquid crystal composition may be a twisted nematic phase liquid crystal composition. The liquid crystal composition may have a nematic phase-isotropic phase transition temperature (Tni) of about 78° C. or more and may have a pitch of about 50 μm to about 80 μm. In addition, the liquid crystal composition may have a dielectric anisotropy ($\Delta \in$) of from about 4.0 to about 6.0 and a rotational viscosity of about 55 mPa·s or less.

The parallax barrier panel PB may include a first substrate SUB3, a second substrate SUB4 facing the first substrate SUB3, and a light transforming liquid crystal layer (not illustrated) disposed between the first substrate SUB3 and the second substrate SUB4. A first electrode (not illustrated) may be provided on the first substrate SUB3. Second electrodes (not illustrated) may be provided on the second substrate SUB4. The first electrode may be a common electrode covering a surface of the first substrate SUB3. The second electrodes may extend in one direction to form a striped pattern. Adjacent second electrodes may be disposed in parallel.

The light transforming liquid crystal layer may include a twisted nematic liquid crystal composition. The light transforming liquid crystal layer may include the same liquid crystal composition as that in the liquid crystal layer in the liquid crystal display panel DP, however, may not be limited thereto. The liquid crystal composition may have a different ratios of liquid crystals than the liquid crystal composition in the liquid crystal layer of the liquid crystal display panel DP, within a given amount range, in accordance with exemplary embodiments. In addition, the liquid crystals may be generally white type liquid crystals.

In the liquid crystal display device having the above-described constitution, the parallax barrier panel PB may be turned off during a 2D operating mode, so as to transmit received light unchanged. Accordingly, the liquid crystal display device may display a two-dimensional image during the 2D operating mode.

The parallax barrier panel PB may be operated in a 3D operating mode for displaying a three-dimensional image. In the 3D operating mode, the liquid crystal display panel DP may be divided into left eye pixel parts L for displaying an image for a left eye and right eye pixel parts R for displaying an image for a right eye. The left eye pixel part L and the right eye pixel part R may be alternately disposed. The parallax barrier panel PB may include openings OPN and blocking members BM, which may have the form of a black matrix, alternately arranged in one direction (for example, in a longitudinal direction). The openings OPN and the blocking members BM may be respectively correspond to the left eye pixel parts and the right eye pixel parts. Accordingly, image information for the left eye may be separated by the parallax barrier PB and projected to a left eye LE of an observer, and image information for the right eye may be separated by the parallax barrier BP and projected to a right eye RE of the observer. Due to the binocular disparity of the left eye LE and the right eye RE, the observer may recognize the image displayed on the liquid crystal display panel DP as a stereoscopic image.

The driving mode of the liquid crystal display device may be converted between the 2D mode and the 3D mode, as described above. Alternatively, only the 3D mode may be provided by fixing the alternately arranged openings and blocking members in one direction (for example in the longitudinal direction).

Figure 3:
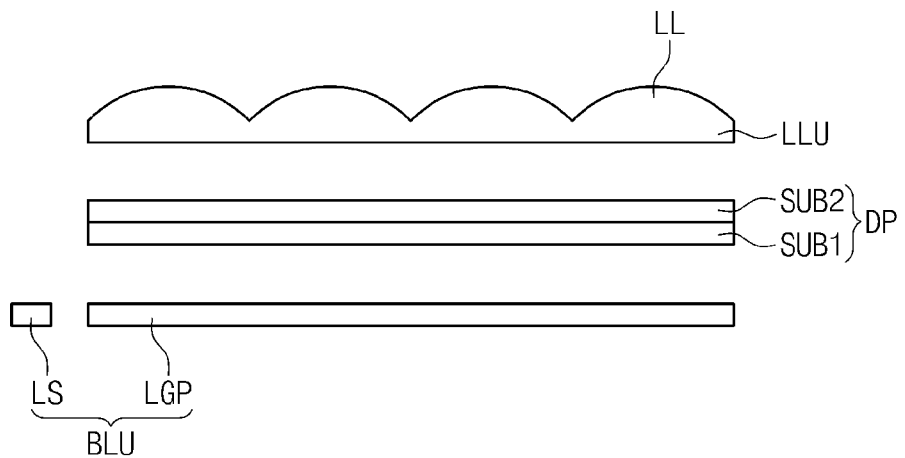
FIG. 3 is a cross-sectional view of a liquid crystal display device having a lenticular lens mode in accordance with an exemplary embodiment of the present inventive concept.
Figure 4:
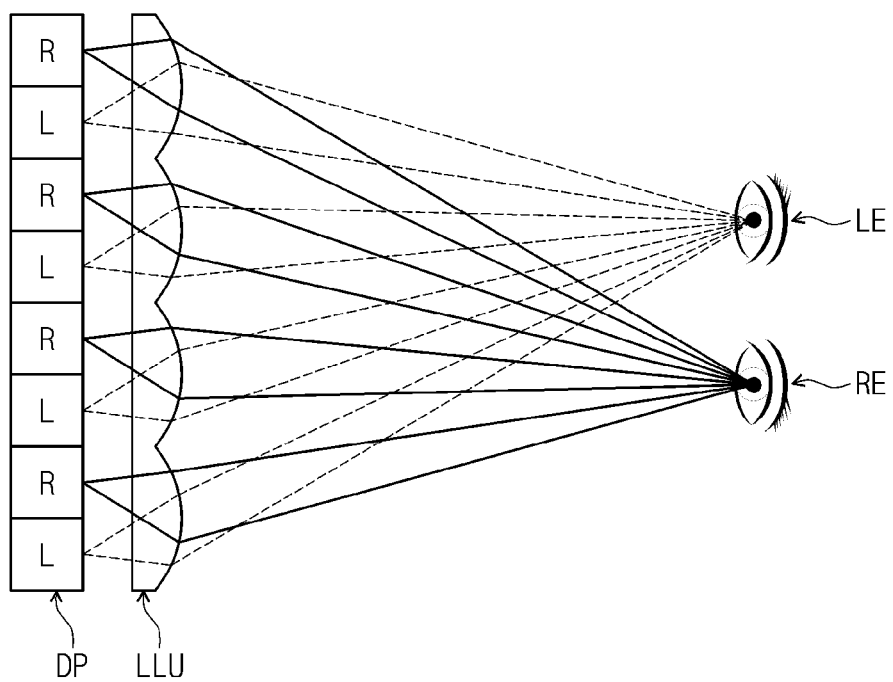
FIG. 4 is a cross-sectional view of the liquid crystal display device in FIG. 3 illustrating an operation of a three-dimensional mode.

FIG. 3 is a cross-sectional view of a liquid crystal display device having a lenticular lens mode, in accordance with an embodiment of the present inventive concept. FIG. 4 is a cross-sectional view of the liquid crystal display device in FIG. 3, illustrating an operation of a 3D mode. For the convenience of explanation, the display device may be illustrated in a simplified manner and may include a liquid crystal display panel DP and a lenticular lens unit LLU.

Referring to FIGS. 3 and 4, the liquid crystal display device in accordance with exemplary embodiments may include a backlight unit BLU to provide light, a liquid crystal display panel DP to display an image using the light, and a lenticular lens unit LLU to transform the displayed image on the liquid crystal display panel DP.

The liquid crystal display panel DP may include a liquid crystal display panel substantially the same as that illustrated in Exemplary Embodiment 1. Thus, an explanation of similar elements is omitted.

The lenticular lens unit LLU may transform a two-dimensional image displayed on the liquid crystal display panel DP into a three-dimensional image. The lenticular lens unit LLU may include a plurality of lenticular lenses LL.

Referring to FIG. 4, in the 3D operating mode of the display device i, the liquid crystal display panel DP may include left eye pixels L for displaying an image for a left eye, and right eye pixels R for displaying an image for a right eye. The left eye pixels L and the right eye pixels R may be alternately arranged. The lenticular lens unit LLU may refract light from the left eye pixels L and the right eye pixels R at different angles, respectively toward the left eye LE and the right eye RE of an observer. Accordingly, image information for the left eye may be separated by the lenticular lens unit LLU, and image information for the right eye may be separated by the lenticular lens unit LLU. Due to the binocular disparity of the left eye LE and the right eye RE, the observer may recognize the image displayed on the liquid crystal display panel DP as a stereoscopic image.

In exemplary embodiments, the lenticular lens unit LLU may be obtained using a liquid crystal lens. Particularly, the lenticular lens may be obtained by using a panel including a light transforming liquid crystal layer as in the parallax barrier panel BP. In addition, the lenticular lens unit LLU may include lenses such as Fresnel lenses, corresponding to the lenticular lenses. When the liquid crystal lens is used for manufacturing the lenticular lens unit LLU, liquid crystals of a normally white mode may be used and, in this case, a 2D mode may be accomplished.

Figure 5:
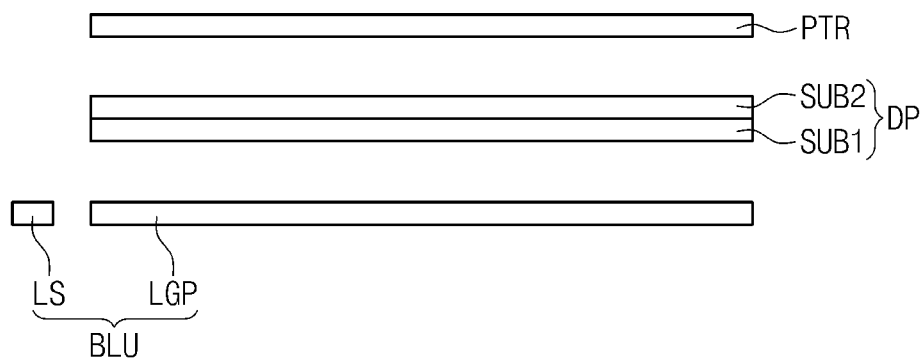
FIG. 5 is a cross-sectional view of a liquid crystal display device having a patterned retarder mode in accordance with an exemplary embodiment of the present inventive concept.
Figure 6:
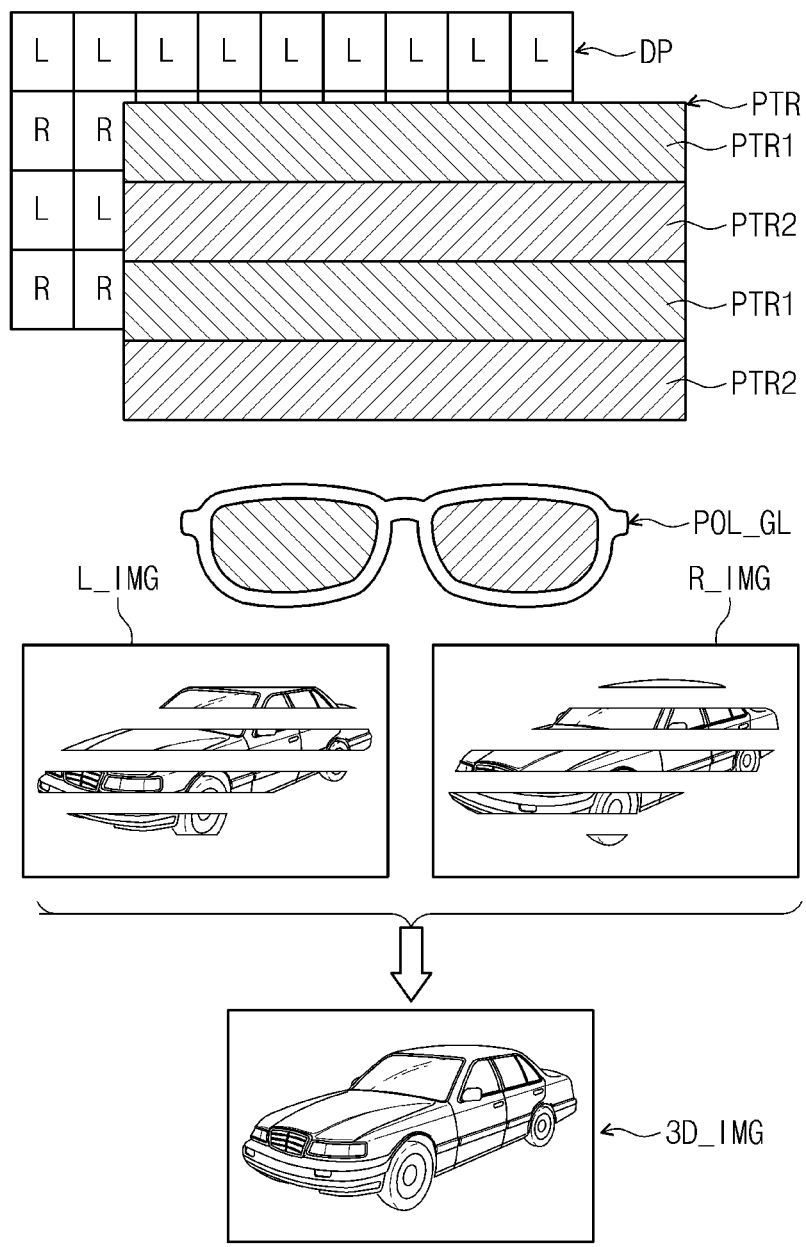
FIG. 6 is a conceptual diagram of the liquid crystal display device in FIG. 5 illustrating an operation of a three-dimensional mode.

FIG. 5 is a cross-sectional view of a liquid crystal display device having a patterned retarder mode in accordance with an embodiment of the present inventive concept. FIG. 6 is a conceptual diagram of the liquid crystal display device in FIG. 5 illustrating an operation of a 3D mode. For the convenience of explanation, the liquid crystal display device may include a display panel DP and a patterned retarder PTR, and explanation on a backlight unit may be omitted.

Referring to FIG. 5, the liquid crystal display panel may include a backlight unit BLU to provide light, a liquid crystal display panel DP to receive the light and display an image, and a patterned retarder PTR to convert the image displayed on the liquid crystal display panel DP.

The liquid crystal display panel DP may be substantially the same as the liquid crystal display panel illustrated in Exemplary Embodiment 1. As such, an explanation of similar elements is omitted.

Referring to FIG. 5 again, when operated in a 3D mode, the liquid crystal display panel DP may include left eye pixels L to display a left eye image and right eye pixels R to display a right eye image. The left eye pixels L and the right eye pixels R may be alternately arranged. Particularly, the left eye pixels L may be disposed in odd-numbered columns and the right eye pixels R may be disposed in even-numbered columns, for example.

The image for the left eye and the image for the right eye may be separated into two polarized components by the patterned retarder PTR. The patterned retarder PTR may include a first retarder PTR1 corresponding to the left eye pixels L and a second retarder PTR2 corresponding to the right eye pixels R. Light absorption axes of the first and second retarders PTR1 and PTR2 are perpendicular to each other. The first retarder PTR1 may transmit a first polarized (circularly polarized or linearly polarized) component of the left eye image, and the second retarder PTR1 may transmit a second polarized (circularly polarized or linearly polarized) component of the right eye image. Particularly, the first retarder PTR1 may include a polarization filter for transmitting left circularly polarized light and the second retarder PTR2 may include a polarization filter for transmitting right circularly polarized light.

An image for left eye L_IMG penetrated the first retarder PTR1 may be incident to a left eye of polarization glasses POL_GL and an image for right eye R_IMG penetrated the second retarder $PTR_2$ may be incident to a right eye of polarization glasses POL_GL to finally provide a stereoscopic image 3D_IMG for an observer.

In exemplary embodiments, the patterned retarder PTR may be obtained using a liquid crystal panel. Particularly, the patterned retarder may be obtained by using a panel including a light transforming liquid crystal layer, as in the parallax barrier panel BP. When the liquid crystal panel is used for manufacturing the patterned retarder, liquid crystals of a normally white mode may be used and, in this case, a 2D mode may be accomplished.

The liquid crystal composition in accordance with exemplary embodiments of the inventive concept may have a high nematic phase-isotropic phase transition temperature and a high response time, while having substantially the same refractive index anisotropy, dielectric anisotropy and rotational viscosity as those of the conventional liquid crystal composition for a three-dimensional mode.

The liquid crystal display device for a two-dimensional mode or a three-dimensional mode, in accordance with exemplary embodiments of the present disclosure, includes the above-described liquid crystal composition. Since the nematic phase-isotropic phase transition temperature of the liquid crystal composition is even higher than that of the conventional liquid crystal composition, liquid crystals in the liquid crystal display device may be largely resistant to degradation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition comprising, based on the total weight of the liquid crystal composition:
   about 48 wt %-about 55 wt % of at least one first neutral liquid crystal selected from the group consisting of compounds represented by following chemical formula 1;
   about 27 wt %-about 31 wt % of at least one second neutral liquid crystal selected from the group consisting of compounds represented by following chemical formula 2;
   about 4.9 wt %-about 5.2 wt % of at least one first polar liquid crystal selected from the group consisting of compounds represented by following chemical formula 3;
   about 13 wt %-about 15 wt % of at least one second polar liquid crystal selected from the group consisting of compounds represented by following chemical formula 4; and
   about 2.0 wt %-about 2.1 wt % of at least one third polar liquid crystal represented by following chemical formula 5,

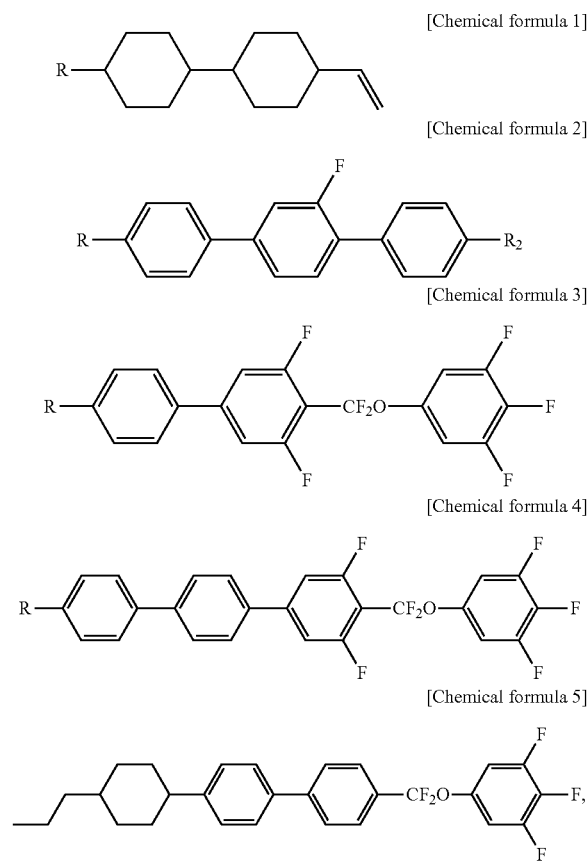

[Chemical formula 1]
[Chemical formula 2]
[Chemical formula 3]
[Chemical formula 4]
[Chemical formula 5]

wherein each of R, $R_1$, and $R_2$ represents an alkyl group, an alkenyl group, or an alkoxy group, having 2-5 carbons.

2. The composition of claim 1, wherein the liquid crystal composition has a nematic-isotropic phase transition temperature (Tni) of about 78° C.

3. The composition of claim 1, wherein the liquid crystal composition has a twisted nematic phase.

4. The composition of claim 1, wherein the liquid crystal composition has a dielectric anisotropy of about 4.0-about 6.0.

5. The composition of claim 1, wherein the liquid crystal composition has a rotational viscosity of about 55 mPa·s.

6. A liquid crystal display device comprising:
   a backlight unit to emit light; and
   a liquid crystal display panel configured to display an image using the emitted light, the liquid crystal display panel comprising:
   a first substrate and an opposing second substrate; and
   a liquid crystal composition provided between the first and second substrates, and comprising, based on the total weight of the liquid crystal composition:
   about 48 wt %-about 55 wt % of at least one first neutral liquid crystal selected from the group consisting of compounds represented by following chemical formula 1;
   about 27 wt %-about 31 wt % of at least one second neutral liquid crystal selected from the group consisting of compounds represented by following chemical formula 2;
   about 4.9 wt %-about 5.2 wt % of at least one first polar liquid crystal selected from the group consisting of compounds represented by following chemical formula 3;

about 13 wt %-about 15 wt % of at least one second polar liquid crystal selected from the group consisting of compounds represented by following chemical formula 4; and about 2.0 wt %-about 2.1 wt % of at least one third polar liquid crystal represented by following chemical formula 5,

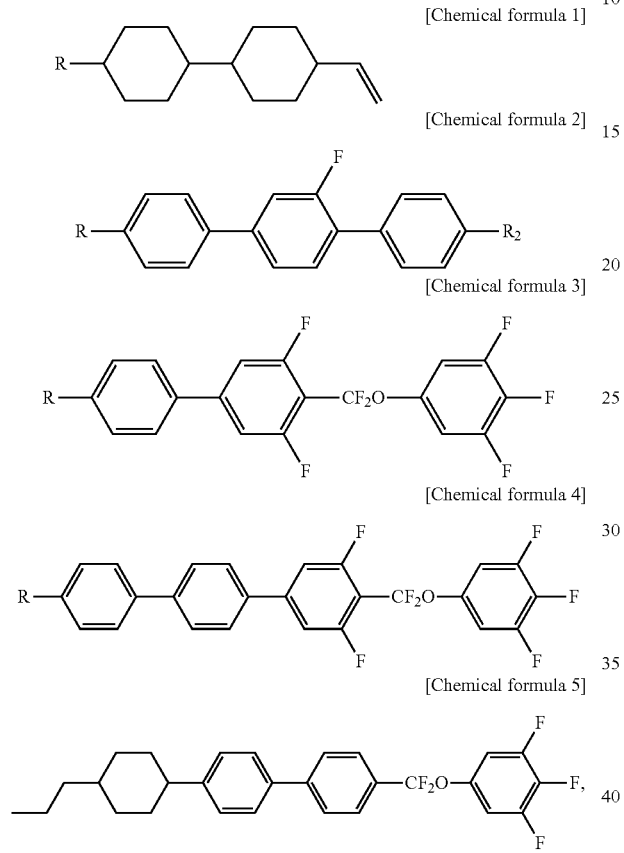

[Chemical formula 1]

[Chemical formula 2]

[Chemical formula 3]

[Chemical formula 4]

[Chemical formula 5]

wherein each of R, $R_1$ and $R_2$ represents an alkyl group, an alkenyl group, or an alkoxy group, having 2-5 carbons.

7. The liquid crystal display device of claim 6, wherein the liquid crystal composition comprises a nematic-isotropic phase transition temperature (Tni) of about 78° C.

8. The liquid crystal display device of claim 7, further comprising a light transforming part provided between the backlight unit and the liquid crystal display panel, or provided on the liquid crystal display panel, the light transforming part configured to convert the image into a right eye image and a left eye image.

9. The liquid crystal display device of claim 8, wherein the light transforming part is a parallax barrier panel having openings to emit light and blocking members to block light.

10. The liquid crystal display device of claim 8, wherein the light transforming part is a panel comprising lenticular lenses.

11. The liquid crystal display device of claim 8, wherein the light transforming part is a patterned retarder configured to convert the image into images having different directions of polarization.

12. The liquid crystal display device of claim 8, wherein the light transforming part comprises:
a first substrate and an opposing second substrate; and
a light transforming liquid crystal layer provided between the first and second substrates,
wherein the light transforming part is configured to be turned off when the liquid crystal display device is driven in a 2D mode to display a two-dimensional image and is configured to be turned on when the liquid crystal display device is driven in a 3D mode to display a three-dimensional stereoscopic image.

13. The liquid crystal display device of claim 12, wherein the light transforming liquid crystal layer comprises a liquid crystal composition comprising:
about 48 wt %-about 55 wt % of at least one first neutral liquid crystal selected from the group consisting of compounds represented by the chemical formula 1;
about 27 wt %-about 31 wt % of at least one second neutral liquid crystal selected from the group consisting of compounds represented by the chemical formula 2;
about 4.9 wt %-about 5.2 wt % of at least one first polar liquid crystal selected from the group consisting of compounds represented by the chemical formula 3;
about 13 wt %-about 15 wt % of at least one second polar liquid crystal selected from the group consisting of compounds represented by the chemical formula 4; and
about 2.0 wt %-about 2.1 wt % of a third polar liquid crystal represented by the chemical formula 5 on the basis of the liquid crystal composition.

14. The liquid crystal display device of claim 12, wherein the light transforming part arranges the liquid crystals of the light transforming liquid crystal layer into lenses, during the 3D mode.

15. The liquid crystal display device of claim 12, wherein the light transforming liquid crystal layer forms alternately disposed openings and blocking members, during the 3D mode.

16. The liquid crystal display device of claim 12, wherein the light transforming liquid crystal layer comprises alternately disposed first retarders and second retarders, during the 3D mode, the first and second retarders having different polarization axes.

17. The liquid crystal display device of claim 6, wherein the liquid crystal composition comprises a twisted nematic phase.

18. The liquid crystal display device of claim 6, wherein the liquid crystal composition has a dielectric anisotropy in a range of about 4.0-about 6.0.

19. The liquid crystal display device of claim 6, wherein the liquid crystal composition has a rotational viscosity of about 55 mPa·s.

20. The liquid crystal display device of claim 6, wherein a response time of the liquid crystal composition is about 4.0 ms.

* * * * *